No. 769,199. PATENTED SEPT. 6, 1904.
D. W. TOWER.
DEVICE FOR FASTENING FURNITURE TRIMMINGS.
APPLICATION FILED DEC. 3, 1903.
NO MODEL. 3 SHEETS—SHEET 1.
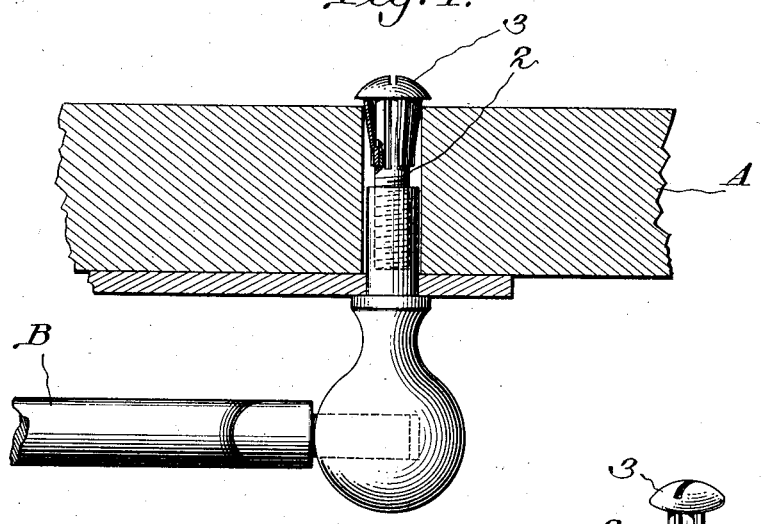
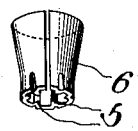
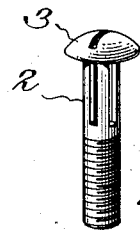
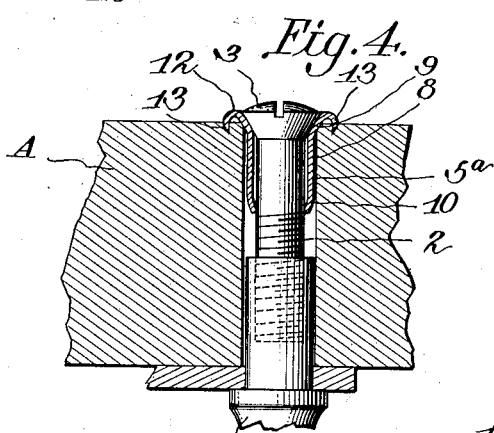
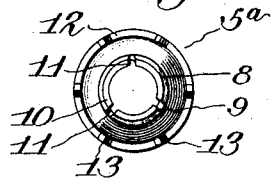
Daniel W. Tower, Inventor.
by C. A. Snow & Co.
Attorneys
Witnesses No. 769,199. PATENTED SEPT. 6, 1904.
D. W. TOWER.
DEVICE FOR FASTENING FURNITURE TRIMMINGS.
APPLICATION FILED DEC. 3, 1903.
NO MODEL. 3 SHEETS—SHEET 2.
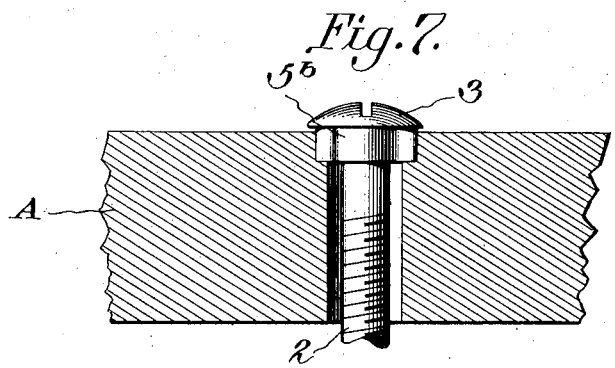
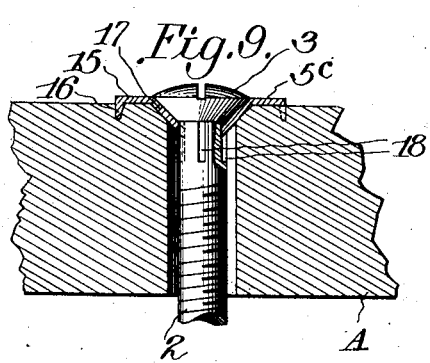
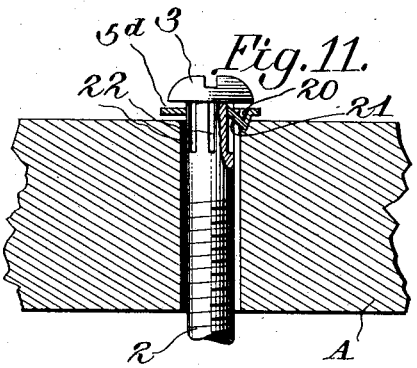
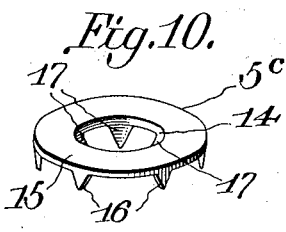
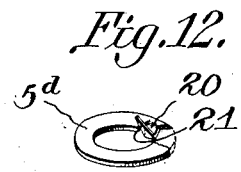
Witnesses
Daniel W. Tower,
Inventor.
by C. A. Snow & Co
Attorneys No. 769,199. PATENTED SEPT. 6, 1904.
D. W. TOWER.
DEVICE FOR FASTENING FURNITURE TRIMMINGS.
APPLICATION FILED DEC. 3, 1903.
NO MODEL. 3 SHEETS—SHEET 3.
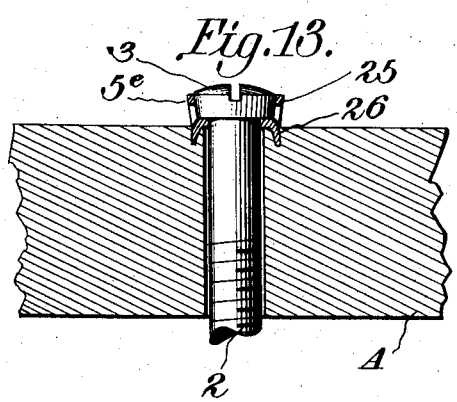
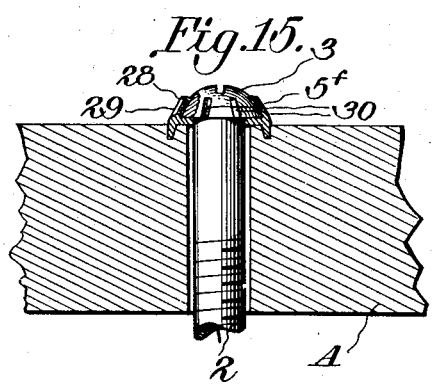
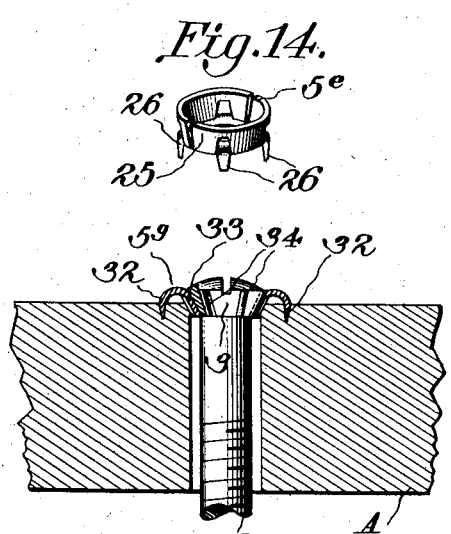
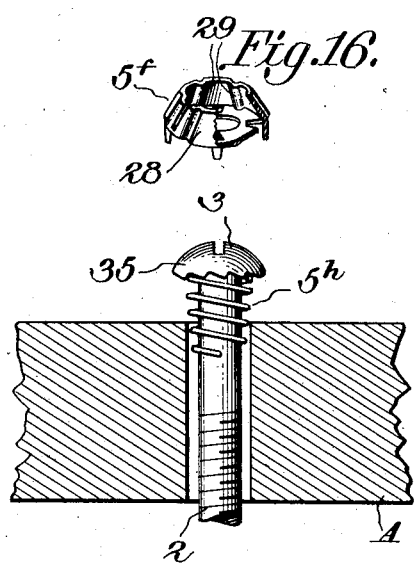
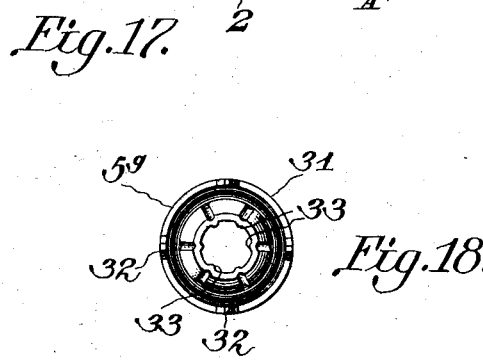
Daniel W. Tower,
Inventor.
by C. A. Snow & Co.
Attorneys
Witnesses No. 769,199. Patented September 6, 1904.

UNITED STATES PATENT OFFICE.

DANIEL W. TOWER, OF GRAND RAPIDS, MICHIGAN.

DEVICE FOR FASTENING FURNITURE-TRIMMINGS.

SPECIFICATION forming part of Letters Patent No. 769,199, dated September 6, 1904.

Application filed December 3, 1903. Serial No. 183,641. (No model.)

*To all whom it may concern:*

Be it known that I, DANIEL W. TOWER, a citizen of the United States, residing at Grand Rapids, in the county of Kent and State of Michigan, have invented a new and useful Device for Fastening Furniture-Trimmings, of which the following is a specification.

This invention relates to certain improvements in devices of that class employed for the fastening of drawer-pulls or knobs and furniture-trimmings in general, the principal object of the invention being to provide a construction of fastening device which when adjusted to proper position will be rigidly locked and held from accidental loosening.

A further object of the invention is to provide a novel form of furniture-fastening in which a screw or bolt is surrounded by a collar or washer of such construction as to contract around the screw or bolt, and thus hold the latter from rotative movement either by frictional or by positive interlocking engagement therewith.

A still further object of the invention is to provide a clamping and locking member formed of yieldable or of spring material which is gradually tightened around the screw or bolt to be locked and comes into firm locking engagement therewith.

With these and other objects in view, as will hereinafter more fully appear, the invention consists in the novel construction and arrangement of parts hereinafter described, illustrated in the accompanying drawings, and particularly pointed out in the appended claims, it being understood that various changes in the form, proportions, size, and minor details of the structure may be made without departing from the spirit or sacrificing any of the advantages of the invention.

In the accompanying drawings, Figure 1 is a sectional elevation of a fastening device constructed in accordance with the invention. Fig. 2 is a detail perspective view of the construction of screw or bolt employed. Fig. 3 is a similar view showing the construction of the locking sleeve or washer. Fig. 4 is a view similar to Fig. 1, showing a slight modification of the invention. Fig. 5 is an elevation of the construction of locking sleeve or washer shown in Fig. 4. Fig. 6 is a plan view of the same. Fig. 7 is an elevation of a slightly-modified construction of locking sleeve or washer. Fig. 8 is a detail perspective view of the same. Fig. 9 is a sectional elevation illustrating a still further modification of the invention. Fig. 10 is a detail perspective view of the construction of washer shown in Fig. 9. Figs. 11 and 12 are views corresponding to Figs. 9 and 10, respectively, and illustrating a further modification of the invention. Fig. 13 is a sectional elevation of a further form of collar or washer which may be employed. Fig. 14 is a perspective view of the same. Fig. 15 is a sectional elevation illustrating a still further modification. Fig. 16 is a perspective view of the sleeve or washer shown in Fig. 15. Fig. 17 is a sectional elevation of a still further modification of the invention. Fig. 18 is an inverted plan view of the form of sleeve or washer shown in Fig. 17. Fig. 19 is a sectional elevation showing a novel form of spring-washer also embodying the invention.

Similar numerals of reference are employed to indicate corresponding parts throughout the several figures of the drawings.

In devices for securing furniture-trimmings in position, particularly in devices of that general type used for securing drawer-pulls and the like, the bolts or screws which extend through the drawer-fronts are likely to become loose from constant use or from shrinkage of the wood, and the pulls or knobs frequently become detached.

It is the object of the present invention to construct a device that will securely lock the revoluble member of the fastener after the same has been adjusted to proper position and positively prevent loosening of the fastening from any use to which it may be subjected under ordinary conditions.

In the drawings, A designates the front of the drawer or other portion of the furniture to which the fastener is to be applied, and B in Fig. 1 is an ordinary form of knob or drawer-pull element to be secured to the furniture. The shank portion of the knob is provided with a threaded recess for the reception of the threaded end of a screw 2, that extends through a suitable opening formed in the front of the drawer or door and is provided with a head 3, having the usual notch for the reception of a driving-tool. In the construction shown in Figs. 1 and 2 the periphery of the screw is provided with a number of notches disposed near the inner surface of its head, and these are adapted to receive small projections 5, carried by a sleeve or washer 6. The sleeve or washer is preferably formed of steel or some similar metal which will retain its elasticity and is tapered or flaring, so as to form an inclined wall for engagement with the wall of the opening through which the screw or bolt extends. The sleeve is slit, and when placed on the bolt or screw its initial diameter is such as to permit slight turning of the screw without effecting corresponding movement of the washer. When the head of the screw comes into positive engagement with the outer enlarged end of the washer, the latter is driven into the opening, and the wall thereof serves by engagement with the tapered outer face of the washer to contract the latter around the screw and cause its projections to firmly engage in the depressions or notches in the periphery of the screw, and thus firmly hold the latter from rotative movement. It will be observed that the length of the depressions or notches with respect to the projections of the sleeve is such that should the parts not be in proper position when the members are engaged there is opportunity for independent longitudinal movement even after the devices are positively locked from independent rotative movement. At the same time the inclined or tapered outer face of the washer or its sleeve will be held in frictional engagement with the wall of the opening, and the frictional resistance to the turning of the sleeve and consequent turning of the screw may be increased to any desired extent by exercising the necessary driving pressure on the screw. With a construction of this kind there is little or no danger of the screw becoming loose through accident or as a result of any ordinary use.

In the construction illustrated in Figs 4, 5, and 6 the washer or sleeve $5^a$ has an approximately cylindrical central portion that is indicated at 8 and is provided with an upper tapered portion 9 and the lower tapered portion 10, a number of slits 11 being formed in the lower portion of the washer in order to permit the contraction of such lower portion. The upper flared end of the washer is bent over to form a flange 12, having one or more pendent spurs or lugs 13, that are pointed to facilitate their entrance into the wood and when so entered prevent further rotation of the sleeve or washer. The construction here shown is such that when the screw is being driven in the sleeve will be retracted by contact with the walls of the opening and will be pressed firmly into frictional engagement with the upper or outer portion of the screw, while independent movement of the sleeve or washer is prevented by the entrance of its prongs 13 into the wood, and, if necessary, interlocking projections and depressions may be formed on the adjacent faces of the screw and the sleeve or washer in order to positively interlock the latter when the screw has been fully entered.

In Figs. 7 and 8 is illustrated a further modification of the invention, being in the form of a clamp to frictionally engage the periphery of the screw. This clamp $5^b$ is preferably formed of a small strip of spring metal centrally bent to form a lug, which may be firmly engaged with the wood when the screw is driven home. The opposite side members of the strip are then bent to encircle the screw, and their terminals are disposed in angular relation and are slightly spaced, so that when entered in a small notch in the wood they will be forced toward each other as the screw is turned, and the intermediate portion of the strip will be firmly clamped on the screw and prevent accidental turning of the latter.

In Figs. 9 and 10 is illustrated a construction that in part embodies the constructions illustrated in Figs. 1 and 4, there being positive interlocking means between the screw and the washer and wood-engaging spurs carried by said washer. In these figures $5^c$ designates a washer having a flaring portion 14 and provided with a ring 15, that has one or more depending prongs 16 for locking engagement with the wood. The inclined portion 14 of the washer is slit or otherwise cut in such manner as to form a plurality of teeth 17, that engage the depressions or notches 18 formed in the periphery of the screw, and the construction is such that as the screw is driven home the teeth or prongs will enter the wood and prevent independent rotative movement of the washer, while the teeth 17 will be deflected inward by the walls of the screw-receiving opening and forced into intimate contact with the notches or depressions 18 of the screw.

Figs. 11 and 12 illustrate a washer of the most simple construction that will serve to positively interlock with the screw and at the same time to positively engage the wood and prevent independent movement of the washer. The washer $5^d$ is in the form of a simple metallic ring cut to form a tongue 20, the pointed end of which, as indicated at 21, is adapted to engage depressions or notches 22, formed in the periphery of the screw, and this pointed end will under normal conditions project for a short distance above the outer face of the washer. The tooth or tongue 20 is further bent intermediate of its length to form a point or tooth 22, that will engage with the wood. When using a washer of this kind, the turning movement of the screw will gradually force the point or tooth 22 into the wood, and as the latter resists the entrace of the tooth the tongue will be forced inward and upward against the inner face of the screw-head. This causes the pointed end 21 of the tooth to move inward into engagement with the periphery of the screw and to enter the notches or depressions therein, so as to firmly interlock the screw and washer and prevent independent rotative movement on either.

In the construction shown in Figs. 13 and 14 the washer or collar is forced into frictional engagement with the tapered circular periphery of the screw-head. This form of washer comprises a ring $5^e$, having an upstruck flange 25 of sufficient internal diameter to receive the tapering head of the screw, and this flange may be slit at a number of places in order to form a plurality of tongues, which engage and firmly clamp the screw-head. At suitable points the metal of the ring and flange is cut away to form a plurality of depending tongues 26, which may enter the wood and serve to positively prevent independent rotative movement of the washer or sleeve. At about the time the screw is fully entered its pressure against the ring will tend to move the central portion of the latter inward, and its flanged edge will come into frictional engagement with the periphery of the screw-head.

In Figs. 15 and 16 is shown a further modification of a character somewhat similar to that illustrated in Figs. 13 and 14; but in this case the washer or sleeve $5^f$ is provided with a flange 28, inclined in a direction opposite to that shown in Fig. 13, and in addition to being slit has a number of teeth or projections 29, adapted to engage depressions or notches 30, formed in the periphery of the screw-head. This further constitutes a double locking of the character shown in Figs. 9 and 10, wherein the washer having marginal prongs enters in the wood, and is further provided with teeth or projections for positively engaging the screw, and these latter teeth or projections are forced into firm engagement with the depressions or recesses formed in the screw-head as soon as the screw is driven home. The construction here shown, moreover, is advantageous in that it practically forms a part of the screw and cannot become lost, the smallest internal diameter of the washer or sleeve being less than the greatest diameter of the screw-head, so that the washer cannot become detached when the screws are to be shipped from the factory or handled by the workmen.

In Figs. 17 and 18 is shown a further modification of the invention, in which the washer or sleeve $5^g$ is in the form of a tapered ring having a circular flange 31, provided with prongs 32, adapted to enter the wood. The tapered flange has projections 33 for engaging depressions or notches 34, formed in the usual tapered head of the screw, and when the latter has been fully entered its engagement with the flange 33 will force the latter slightly into the screw-receiving opening and will cause the flange to contract around the tapered head of the screw and its projections or teeth to engage the notches or depressions of the screw. In this construction also the washer forms a positive interlock between the screw and the woodwork.

Fig. 19 shows a further modification of the invention, in which the washer or sleeve $5^h$ is in the form of a spirally-wound spring, preferably of steel wire. The smallest end of the spring enters the screw-receiving opening, and the under side of the screw-head or nut, as the case may be, is provided with alternate notches or projections, as indicated at 35, into which may enter the upper end of the spring $5^h$. When the screw is driven home, the entrance of the lower and smaller end of the spring will cause the latter to become contracted and to bind firmly between the periphery of the screw and the wall of the opening, while the outer portion of the spring, which may not enter the opening, is compressed and its extreme end by engagement with the successive teeth 35 will prevent movement of the screw in reverse direction.

Having thus described the invention, what is claimed is—

1. The combination with a furniture-trimming having a shank portion, of a screw adapted to engage therewith, and a tapered sleeve surrounding an unthreaded portion of the screw and in engagement with the head thereof, said sleeve and screw having interengaging portions that will permit of relative longitudinal play, but will prevent independent rotative movement, and the sleeve being forced into engagement with said screw under the longitudinal movement imparted to the sleeve by the screw and by contact of the outer surface of the sleeve with the wall of the screw-opening.

2. In a device for fastening furniture-trimmings, a trimming-engaging screw having a ribbed and grooved portion adjacent to its head, and a contractible sleeve mounted on and movable longitudinally with the screw, said sleeve being constructed to engage said ribbed and grooved portion, substantially as specified.

3. In a device for fastening furniture-trimmings, a trimming-engaging screw having a ribbed and grooved shank adjacent to its head, a tapering sleeve of thin metal on the ribbed and grooved portion and adapted to engage therewith, said sleeve being movable into clamping position by engagement with the wall of the screw-opening.

4. In a device of the class specified, a trimming-fastening device comprising a trimming-engaging screw and a contractible sleeve carried by the screw and movable to clamping position thereon by engagement with a portion of the furniture, said sleeve being provided with wood-engaging members.

5. In a device for fastening furniture-trimmings, a screw having a ribbed and grooved portion, and a tapering sleeve formed of thin sheet metal engaging the ribbed and grooved portion of the screw, and movable longitudinally therewith, said sleeve having wood-engaging spurs.

6. The combination with a furniture-trimming, having a shank portion, of a shank-engaging screw having ribs and grooves adjacent to its head, and a tapered split sleeve also having ribs and grooves engaging those of the screw, said sleeve being contracted by engagement with the wall of the screw-receiving opening and being clamped on the screw to hold the latter from rotative movement.

7. In a device for fastening furniture-trimmings, a trimming-engaging screw having an indented head, and a split sleeve surrounding said head and contractible therearound by engagement with the wood, said sleeve having means for engaging the indented portion of the head.

In testimony that I claim the foregoing as my own I have hereto affixed my signature in the presence of two witnesses.

DANIEL W. TOWER.

Witnesses:
H. M. BERTELSON,
PERRY C. PECKHAM.